May 14, 1957     A. A. METTS     2,791,785
RETRIEVING DEVICE

Filed Nov. 15, 1955

ADONIS A. METTS,
INVENTOR.

BY Eaton + Bell

ATTORNEYS

United States Patent Office 2,791,785
Patented May 14, 1957

2,791,785

RETRIEVING DEVICE

Adonis A. Metts, Charlotte, N. C.

Application November 15, 1955, Serial No. 546,859

3 Claims. (Cl. 9—9)

This invention relates to a float-type retrieving device for fishing rods and the like which are accidentally submerged in deep water.

It is an object of the invention to provide an automatically releasable buoy or float attached to the fishing rod which rises to the surface of water when the rod falls therein.

It is another object of the invention to provide a buoyant spool or float on which a retrieving line is wound which is releasably locked in a casing secured to the rod by means of a water dissolvable pin which permits the float to be released upon the rod being submerged in water.

It is a further object of this invention to provide a retrieving device which may be attached as a unitary construction to a fishing rod without necessitating any changes or alterations in the fishing rod or interfering with the operation of the same.

It is also a further object of the invention to provide a retrieving device for a fishing rod having a hollow dissolvable pin releasably securing a float in a casing secured to the rod which upon being submerged in water will dissolve in a very short interval of time to quickly permit the float secured by the pin to be released and the rod to be retrieved.

Some of the objects of the invention having been stated, other objects will appear as the description proceeds when taken in connection with the accompanying drawings, in which—

Figure 1:
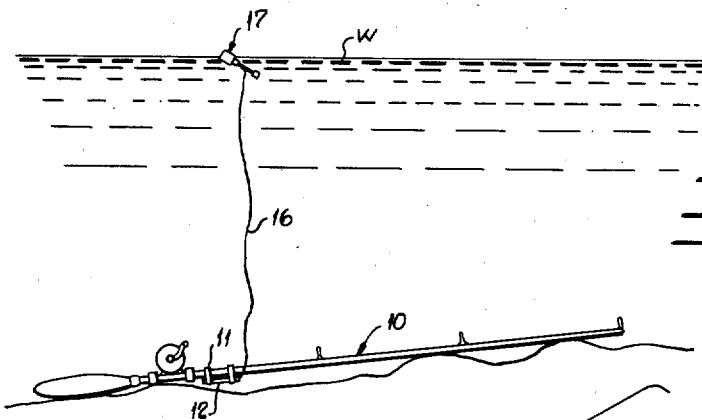
Figure 1 is a side elevational view showing the retrieving device attached to a fishing rod, the rod being submerged and the float released indicating the position of the rod.
Figure 2:
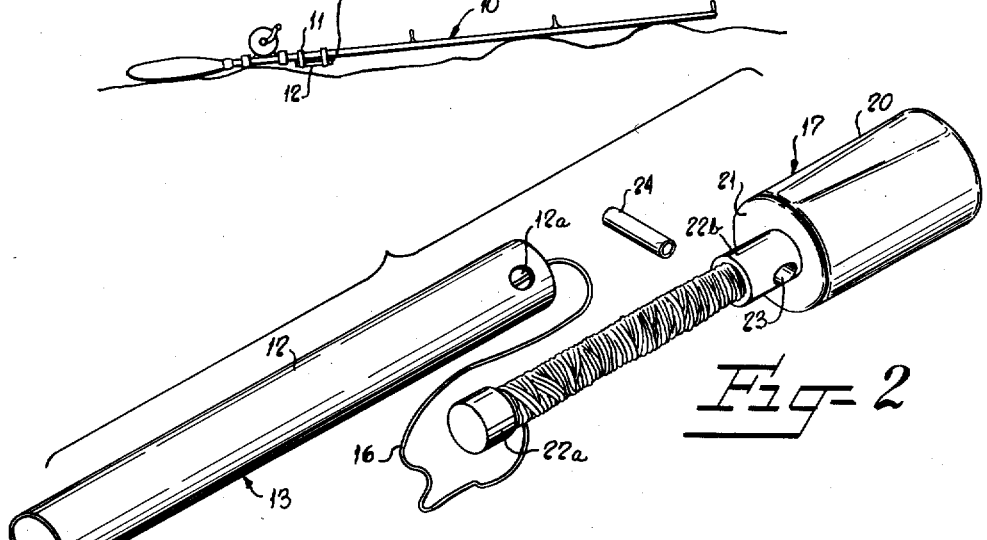
Figure 2 is an enlarged exploded view of the retrieving device.

Referring more specifically to the drawings and particularly Figure 1, reference numeral 10 illustrates a fishing rod having a bracket 11 secured thereto and securing a tubular casing or housing 12 of the retriever device broadly indicated at 13. A retrieving line 16, preferably formed of nylon, has one end securely positioned in the casing 12 and leads to a float 17 which has been released from the device and is shown as floating on the surface of water W.

The housing or casing 12 of the retriever device is formed of a hollow tube having one end sealably closed by a plug or stopper member 14 having a reduced inner portion 14a in which is embedded one end of an ejecting spring 15. The other end of the housing 12 is open and is provided with alined apertures 12a adjacent the open end to receive a locking pin therein. One end of the retrieving line 16 is secured as by knotting to the ejecting spring 15, while the other end of the line is secured to a float or buoy broadly indicated at 17.

The float 17 comprises an enlarged end portion 20 formed of wood or a suitable hollow plastic material which enlarged portion defines a shoulder 21. Formed integral with the enlarged end portion 20 is a spool-like portion or stem 22 having enlarged ends or flanges 22a, 22b of a slightly smaller diameter than the inner diameter of the tube 12 for guiding the float 17 into the housing 12. The flange 22b is provided with an aperture 23 to be alined with apertures 12a to receive a locking pin therein. The portion of the stem or spool 22 defined by the flanges 22a, 22b is of a small enough diameter to receive windings of the retrieving line 16 thereon of a sufficient amount to permit the float 17 to float to the surface of the water upon the fishing rod accidentally being submerged in deep water.

A hollow pin 24 of a dissolvable vegetable or chemical compound is provided for being received in the apertures 12a of the tube 12 and apertures 23 of the float 17 to releasably secure the spool portion 22 of the float 17 inside the housing 12.

Figure 3:
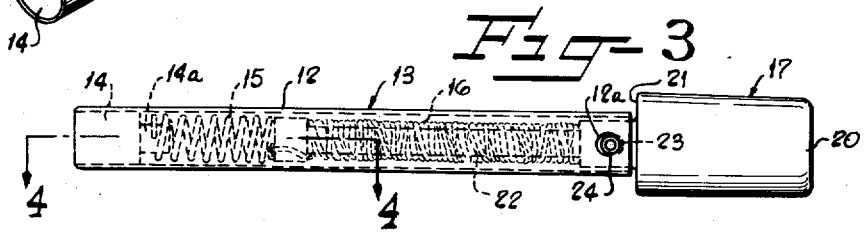
Figure 3 is a view of the retrieving device in assembled position.

In assembling the retriever device 13, the flange 22a of the stem or spool 22 of the float 17 is inserted in the housing 12 to compress the spring 15 into the position shown in Figure 3. The shoulder 21 on the float 17 engages the open end of the housing 12 when the stem 22 is fully inserted therein, at which time the float 17 is rotated to aline the aperture 23 with the apertures 12a in the housing 12. The hollow pin 24 is then inserted to releasably maintain the spring 15 in compressed position.

Figure 4:
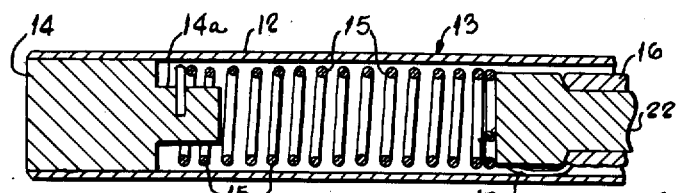
Figure 4 is a horizontal sectional view taken along line 4—4 of Figure 3 on an enlarged scale showing the manner in which the ejecting spring is positioned in the tubular casing with respect to the float.

The shoulder 21 serves as the means for stopping the inward movement of the spool or stem 22 into the casing or tube 12 so as to readily permit the alinement of the aperture 23 with the apertures 12a for assembling the device. As will be observed in Figure 4, the end portion of the retrieving line 16 which is secured to the spring 15 lies between the housing 12 and the flange 22a of the spool or stem 22 and there is a sufficient clearance therebetween to prevent the line 16 from being severed by the flange 22a when the apparatus is assembled.

The provision of the hollow pin 24 permits the same to be more readily dissolved than if the pin were solid since water may flow into the tubular pin and around the same to quickly dissolve the same and permit the float 17 to be ejected out of the housing 12 by the spring 15. It will be observed in Figure 3 that the apertures 12a in the housing 12 are of a diameter slightly larger than the diameter of the tubular pin 24 to readily permit the water to flow around the same and quickly dissolve the pin.

It is thus seen that there has been provided a compact retriever device which is so constructed that the same may readily be assembled by the simple operation of inserting a water dissolvable pin through the housing and float to place the ejection spring under compression. Therefore, the retriever device may be used an indefinite number of times for reclaiming submerged articles by only replacing the dissolvable pin.

In the drawings and specification there has been set forth a preferred embodiment of the invention, and although specific terms are employed, they are used in a generic and descriptive sense only and not for purposes of limitation, the scope of the invention being defined in the claims.

I claim:

1. An article retrieving device comprising a tubular housing having one end sealably closed, a float detachably fitted in the other end of said housing, a spring in said housing abutting the sealed end for ejecting the float from the housing, a retrieving line wound upon a portion of said float and having one end secured to the float and the other end of said line being fixedly secured inside the housing, said housing and float having apertures therein for being alined with each other, and a tubular dissolvable pin positioned in said apertures for maintaining the float in the housing against the action of said spring.

2. An article retrieving device comprising a tubular casing, closure means closing one end of said casing, a spring in said casing abutting and secured to said closure means, a float positioned in the other end of said casing, said float having a stem portion, a retrieving line wound upon the stem portion of said float and one end of the line fixedly secured inside the casing, said float also having a shoulder portion for engaging said other end of the casing and serving to position the stem of the float in the casing to a predetermined depth, the end of said casing remote from said spring having alined apertures therein, said stem having an aperture therein normally positioned in alinement with the apertures in the casing, and a water dissolvable tubular pin positioned in said apertures for releasably holding the float in the casing against action of the spring.

3. An article retrieving device comprising an integral hollow tubular casing having one closed end and an open end, a compression spring positioned in said casing and having one end abutting said closed end, an elongated float detachably fitted in said casing to normally maintain the spring compressed, a retrieving line wound upon a portion of said float and having one end fixedly secured inside said casing, said casing having alined apertures therein, said float having an aperture therein for being alined with the apertures in said casing, and a water dissolvable pin inserted in said apertures for releasably securing the float in the casing against the action of the spring.

References Cited in the file of this patent

UNITED STATES PATENTS

| | | |
|---|---|---|
| 1,252,876 | Barrett | Jan. 8, 1918 |
| 2,528,799 | Strong | Nov. 7, 1950 |

FOREIGN PATENTS

| | | |
|---|---|---|
| 526,425 | Canada | June 19, 1956 |